US011167641B2

(12) United States Patent
Catron et al.

(10) Patent No.: US 11,167,641 B2
(45) Date of Patent: Nov. 9, 2021

(54) SYSTEM AND METHOD FOR RECONFIGURING OPERATOR CONTROLS

(71) Applicant: Deere & Company, Moline, IL (US)

(72) Inventors: Mark Catron, Bettendorf, IA (US); Timothy J Ofenloch, Davenport, IA (US); Joshua D. Hoffman, Bettendorf, IA (US); Ryan G. Brown, Waterloo, IA (US); Mario L. Donini, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/692,251

(22) Filed: Nov. 22, 2019

(65) Prior Publication Data

US 2021/0155093 A1 May 27, 2021

(51) Int. Cl.
| G06F 3/048 | (2013.01) |
| B60K 37/06 | (2006.01) |
| G06F 3/0484 | (2013.01) |
| G06F 3/0488 | (2013.01) |
| B60K 35/00 | (2006.01) |
| A01B 63/32 | (2006.01) |
| B60K 26/02 | (2006.01) |

(52) U.S. Cl.
CPC .............. B60K 37/06 (2013.01); A01B 63/32 (2013.01); B60K 26/02 (2013.01); B60K 35/00 (2013.01); G06F 3/0488 (2013.01); G06F 3/04847 (2013.01); *B60K 2026/029* (2013.01); *B60K 2370/1438* (2019.05); *B60K 2370/151* (2019.05); *B60Y 2200/22* (2013.01)

(58) Field of Classification Search
CPC ....... B60K 37/06; A01B 63/32; E02F 9/2004; E02F 9/2012
See application file for complete search history.

(56) References Cited

U.S. PATENT DOCUMENTS

| 8,339,254 | B2 | 12/2012 | Drew et al. | |
| 9,777,460 | B2 | 10/2017 | Wuisan et al. | |
| 2008/0148184 | A1* | 6/2008 | Davis | G06F 3/1454 715/810 |
| 2016/0319935 | A1* | 11/2016 | Bittner | F16H 63/42 |
| 2018/0142446 | A1* | 5/2018 | Silber | F15B 13/044 |
| 2018/0143734 | A1* | 5/2018 | Ochenas | H04L 12/40 |
| 2019/0390441 | A1* | 12/2019 | Storey | G05B 19/042 |
| 2020/0048865 | A1* | 2/2020 | Dauth | E02F 9/2012 |
| 2020/0053944 | A1* | 2/2020 | Sivinski | A01C 23/047 |

OTHER PUBLICATIONS

Unpublished U.S. Appl. No. 16/450,114, filed Jun. 24, 2019, Nathan R. Demski, et al. (35 pages).

* cited by examiner

Primary Examiner — Rashawn N Tillery

(57) ABSTRACT

A method for reconfiguring operator controls of a work vehicle is disclosed. The method comprises providing a user interface operatively coupled to a control device. Displaying one or more displays of an apparatus configuration on a display screen of the user interface, each of the one or more displays including graphics associated with a function of the apparatus. Associating a control output of a control unit of the control device with the function of the apparatus; and dynamically adjusting, by a controller, the control output of the control unit to reconfigure operator controls of the work vehicle in response to a change in the graphics or a change in the relative arrangement of the one or more displays on the display screen.

18 Claims, 6 Drawing Sheets

SYSTEM AND METHOD FOR RECONFIGURING OPERATOR CONTROLS

FIELD OF THE DISCLOSURE

The present disclosure relates generally to operator controls for a work vehicle, and, more particularly, to a system and method for reconfiguring operator controls in a work vehicle.

BACKGROUND OF THE DISCLOSURE

During the operation of agricultural vehicles, it is desirable to provide increased visibility of machine control functions to operators. Such increased visibility can lead to intuitive operation of the vehicle and helps to reduce operator errors in operating the work vehicle. Additional concerns with the operation of agricultural vehicles is the number of controls required to operate and navigate vehicle. For example, increased vehicle controls and operating instructions can lead to operator errors as vehicle operators are changed during shifts or can also make it difficult to train new vehicle operators.

As such to address such concerns, there is a need in the art for a robust and simplified operator control system that can be tailored to an operator's preference and which may be easily configured.

SUMMARY OF THE DISCLOSURE

According to an aspect of the present disclosure, a method for reconfiguring operator controls of a work vehicle is disclosed. The method includes providing a user interface operatively coupled to a control device. Displaying one or more displays of an apparatus configuration on a display screen of the user interface, each of the one or more displays including graphics associated with a function of the apparatus. Associating a control output of a control unit of the control device with the function of the apparatus; and dynamically adjusting, by a controller, the control output of the control unit to reconfigure operator controls of the work vehicle in response to a change in the graphics or a change in the relative arrangement of the one or more displays on the display screen.

According to another aspect of the present disclosure, a system for reconfiguring operators controls of a work vehicle is disclosed. The system includes a control device having at least one control unit that is configured to provide a control output corresponding to a function of an apparatus. A user interface is coupled to or arranged proximate the control device and is configured to display one or more graphics of an apparatus configuration on a display screen of the user interface. Each of the one or more graphics is associated with the function of the apparatus. A controller is configured to dynamically adjust the control output of the control unit to reconfigure operator controls of the work vehicle in response to a change in a relative arrangement of the one or more graphics displayed on the user interface.

Other features and aspects will become apparent by consideration of the detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION OF THE DRAWINGS

Figure 1:
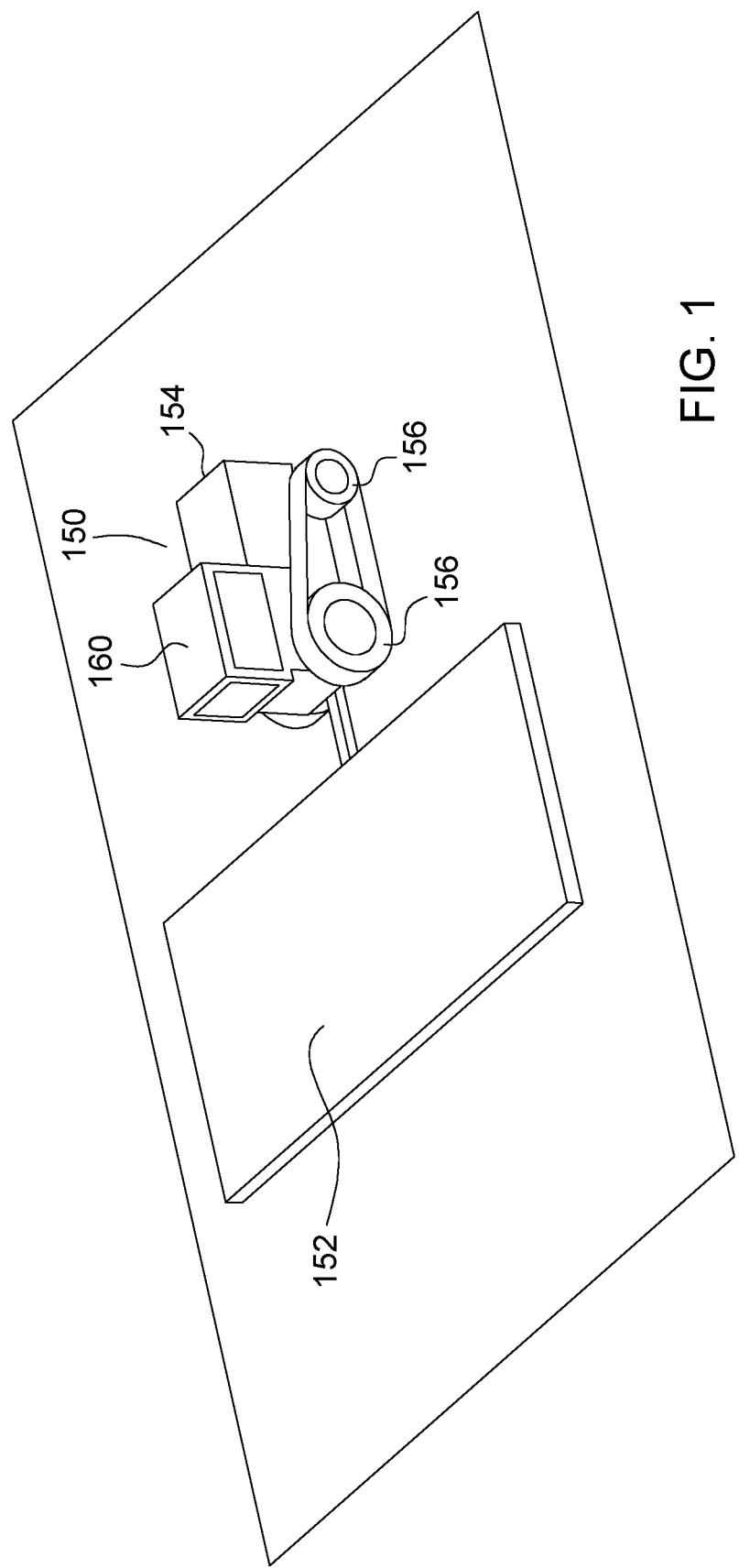
FIG. 1 is a side view of a work vehicle according to an embodiment.
Figure 2A:
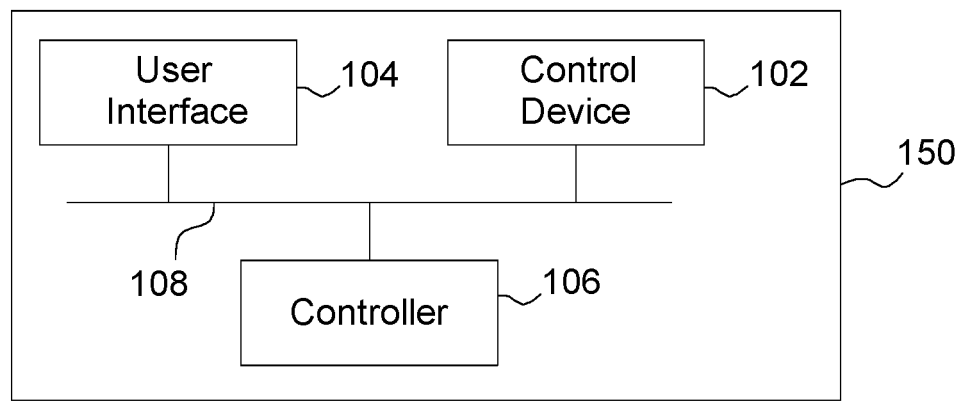
FIG. 2A is a block diagram of a control system according to an embodiment.
Figure 2B:
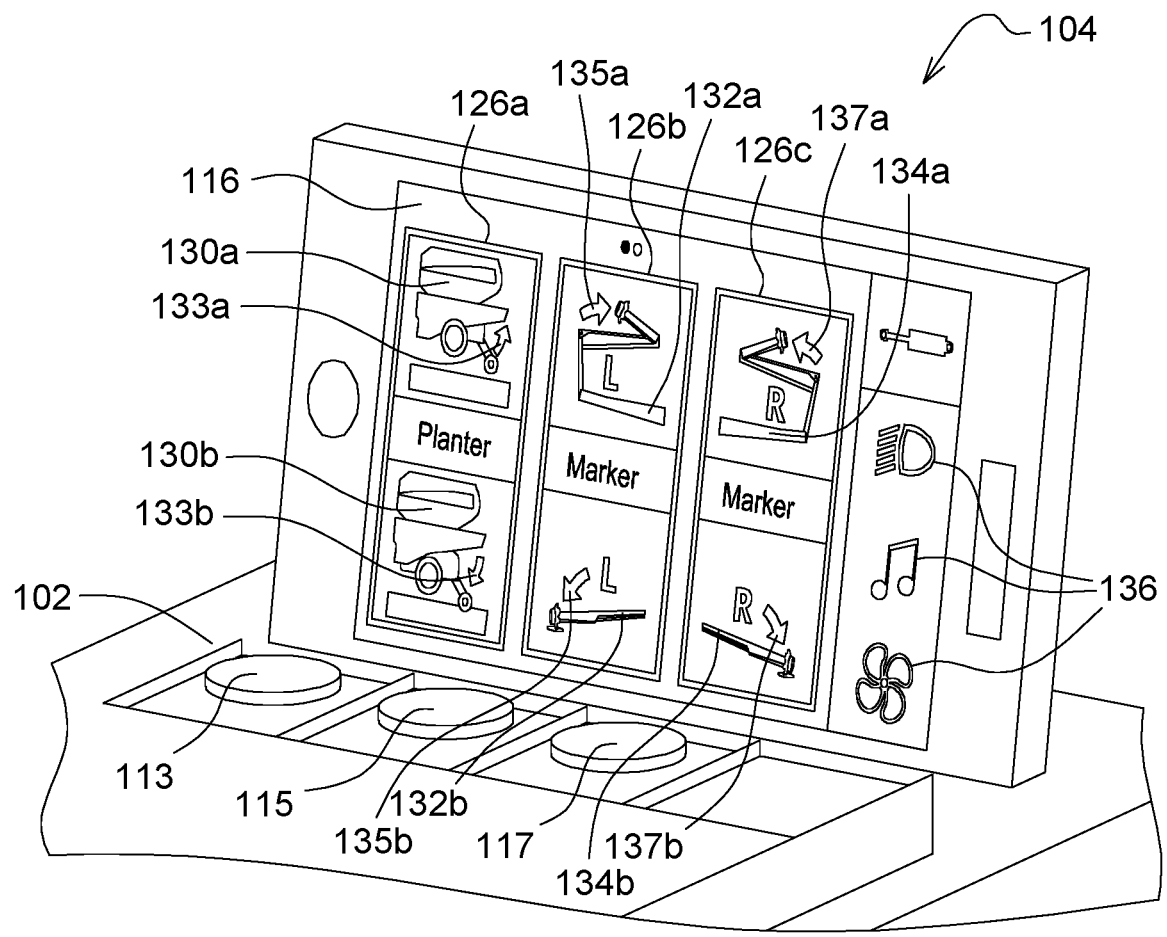
FIG. 2B is an illustration of a user interface and control device arranged in the control system of FIG. 2A according to an embodiment.
Figure 3:
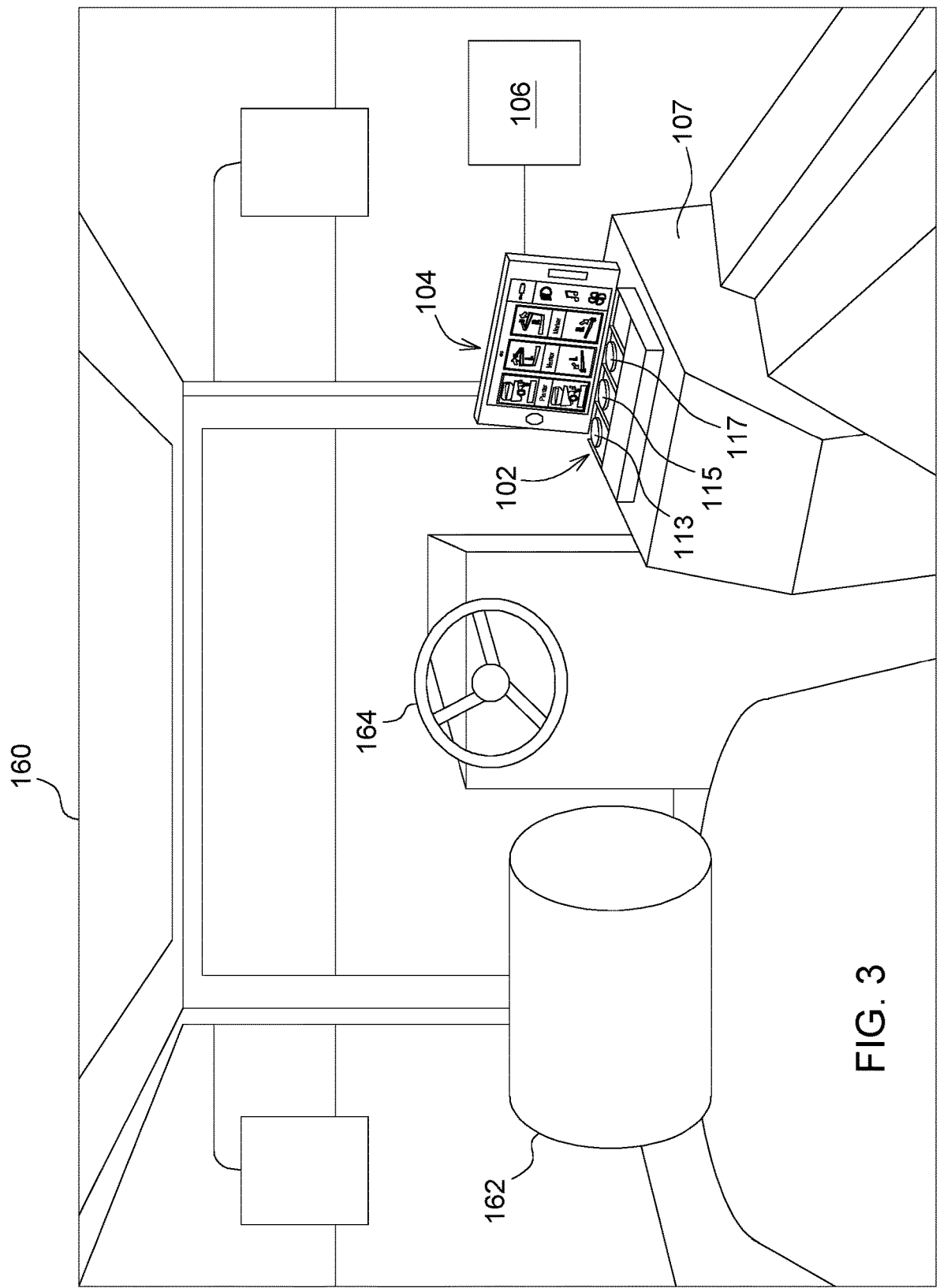
FIG. 3 is an illustration of the control system of FIG. 2 arranged in the work vehicle of FIG. 1 according to an embodiment.

Referring to FIGS. 1-3, a work vehicle 150 including an operator control system 100 for reconfiguring operator controls in the work vehicle 150 is shown. As shown in FIG. 1, the work vehicle 150 can include a tractor having an apparatus such as an implement 152 attached thereto. The work vehicle 150 can comprise a frame 154 that is supported by wheels 156, which can be tracked or untracked. An operator cab 160 can be mounted in an upright position to the frame 154 and can provide an enclosure for an operator seat 162 and various controls such as steering (e.g., steering wheel 164), navigation, and operator controls for controlling operations of the work vehicle 150. In some embodiments, the operator controls can include the operator control system 100 comprising a control device 102 and a user interface 104 communicatively coupled to a controller 106 via a communication bus 108 (FIG. 2A).

As shown in FIGS. 2B and 3, the control device 102 and user interface 104 can be collectively arranged within the operator cab 160 on a console 107 located to the right side of the operator seat 162. The control device 102 can comprise one or more control units 113, 115, 117 arranged to adjust a configuration of the implement 152 or other apparatus attached to the work vehicle 150 or other vehicle components or machine settings in response to an operator input. In some embodiments, the control units 113, 115, 117 can comprise lever controls that operate to move the implement 152 in one or more directions to a desired position. For example, each of the control units 113, 115, 117 can move the implement 152 between a first position and a second position in a corresponding direction of movement as indicated by arrows 133, 135, 137, which can be displayed on the user interface 104. In other embodiments, the control units 113, 115, 117 can comprise a variety of controls such as push buttons (e.g., rocker switches), rotary dials, joystick controllers, or other suitable control devices to adjust a configuration of the implement 152. For example, the joystick controller can provide an increased range of motion that allows the implement 152 to be moved in several directions.

The user interface 104 can be coupled to or arranged proximate the control device 102 inside the operator cab 160 in a location that is easily accessible and viewable by an operator. In some embodiments, the user interface 104 can comprise a touchscreen display that is configured to receive touch inputs or commands from an operator to allow the operator to configure a display screen 116. In other embodiments, the user interface 104 can receive control inputs via voice command or keyboard inputs, for example. The user interface 104 allows the operator to adjust the control outputs associated with the control units 113, 115, 117 by configuring the appearance and function of the display screen 116. For example, as will be discussed with reference to FIGS. 4-6, the operator can configure the display screen 116 by arranging one or more graphics 130, 132, 134 in various arrangements on displays 126a, 126b, and 126c, with each graphic corresponding to an apparatus configuration and function. As shown in FIG. 2, in some embodiments, the display screen 116 can include displays 126a, 126b, and 126c to display the various apparatus configurations. The display screen 116 can also comprise machine controls graphics 136. Additionally, in some embodiments, the display screen 116 can also display vehicle and/or implement or machine statuses such as flow rate, position states, or changes in pressure. Although three control displays (i.e., 126a, 126b, and 126c) are shown in FIG. 2, in other embodiments, the number of displays and control settings can vary based on application requirements, user preferences, screen size, etc.

The controller 106 can be arranged locally as part of a vehicle electronics unit (not shown) or remotely at a remote processing center. The controller 106 can be configured to process inputs received from the control units 113, 115, 117 or user interface 104 as position inputs and subsequently control actuators coupled to the implement 152 to change one or more configurations of the implement 152. For example, the position inputs can correspond to a desired movement of the implement 152 in one or more directions to position or reposition the implement 152 in a selected configuration.

In various embodiments, the controller 106 can comprise a microprocessor, a microcontroller, a central processing unit, a programmable logic array, a programmable logic controller, an application specific integrated circuit, a logic circuit, an arithmetic logic unit, a graphics processing unit (GPU), field programmable gate arrays (FPGAs), or other suitable programmable circuitry that is adapted to perform data processing and/or system control operations. The controller 106 can be configured to dynamically adjust a control output of the each of the control units 113, 115, 117 in response to a modification of the relative arrangement of the graphics 130, 132, 134 as will be discussed herein.

As will be appreciated by those skilled in the art, FIGS. 1-3 are provided for illustrative and exemplary purposes only and are in no way intended to limit the present disclosure or its applications. In other alternative embodiments, the arrangement and/or structural configuration of the operator control system 100 can vary. For example, in some embodiments, the operator control system 100 can comprise a dual user interface arrangement or a dual control system arrangement, with each being arranged side by side or in separate locations inside the operator cab 160.

Figure 4:
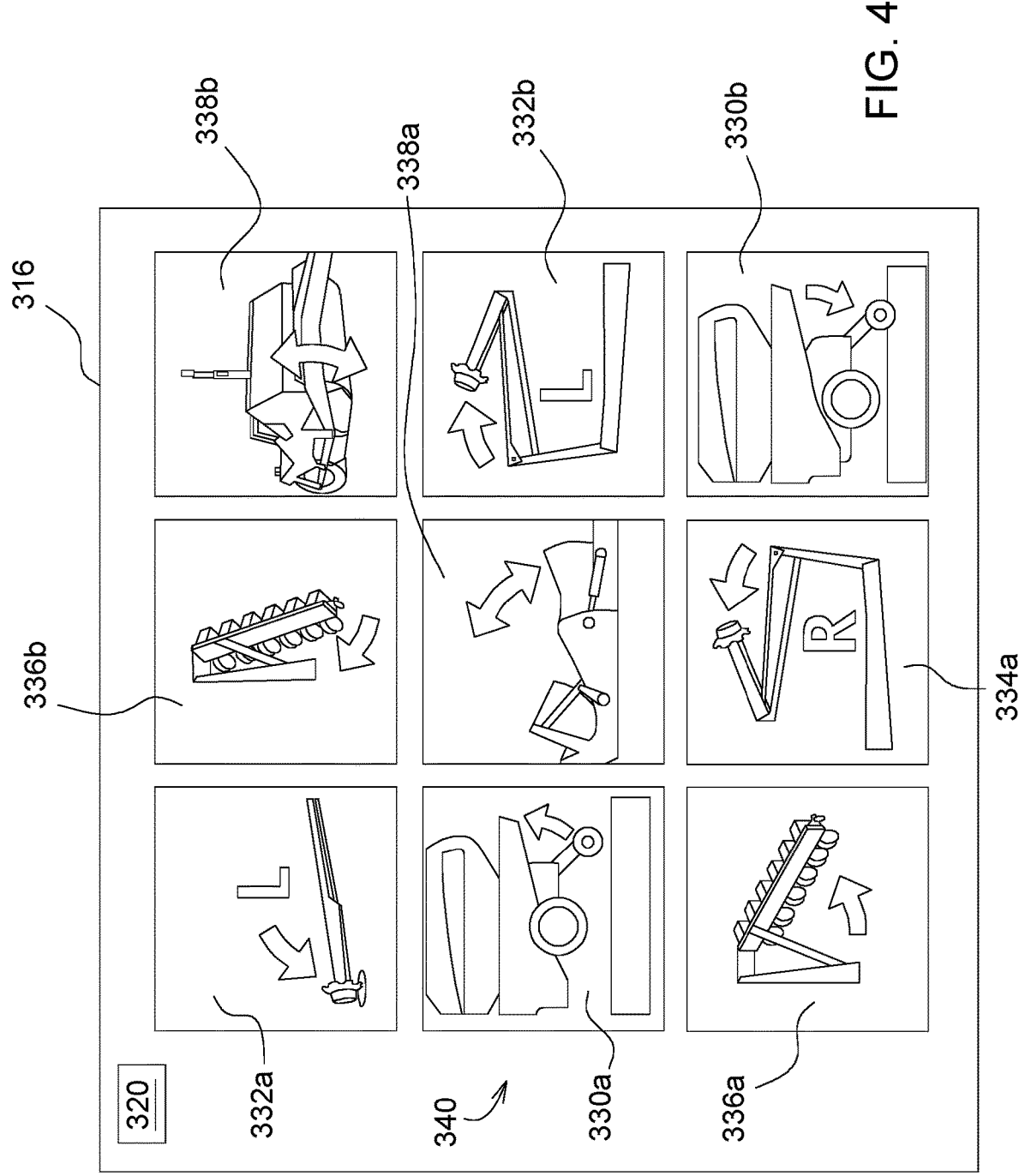
FIG. 4 is an illustration of a display screen displayed on a user interface of the control system of FIG. 2 according to an embodiment.
Figure 5:
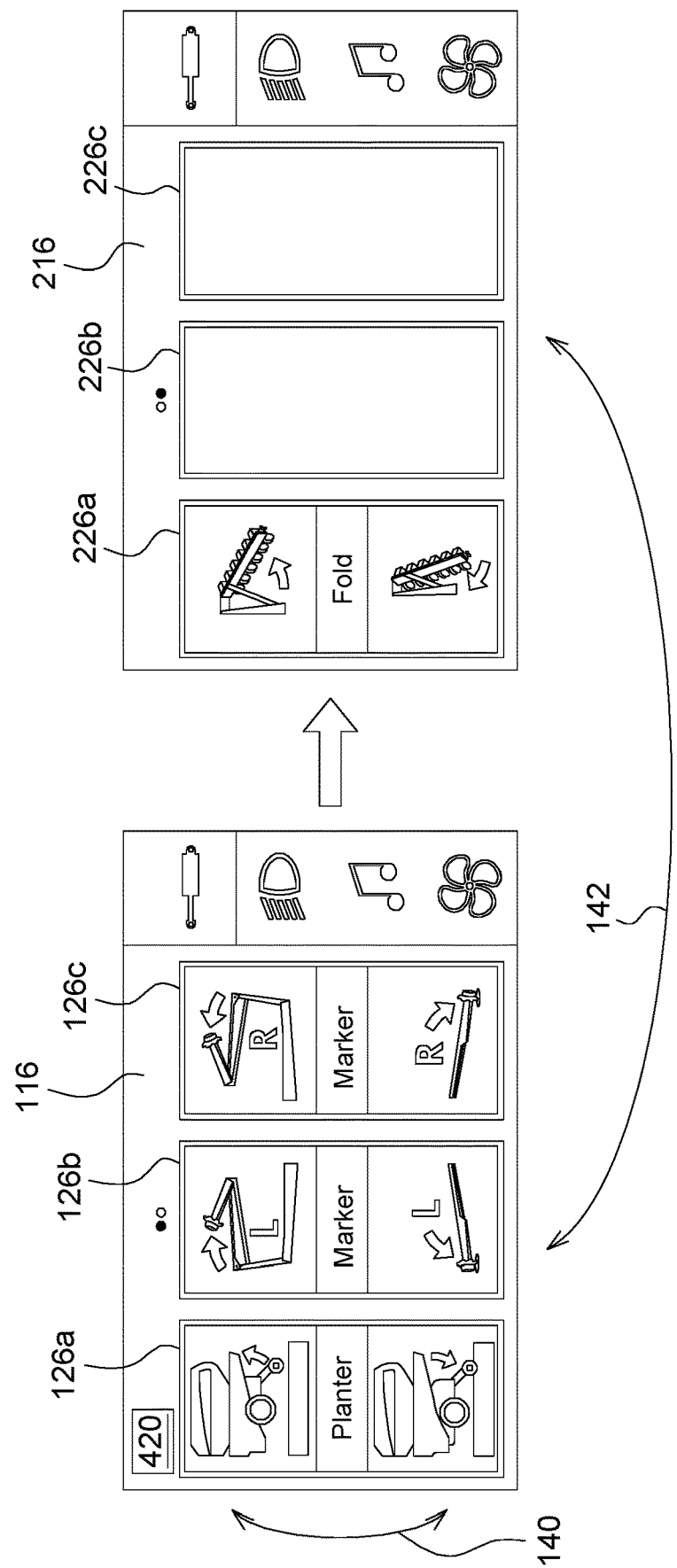
FIG. 5 is an illustration of a display screen displayed on a user interface of the control system of FIG. 2 according to an embodiment.
Figure 6:
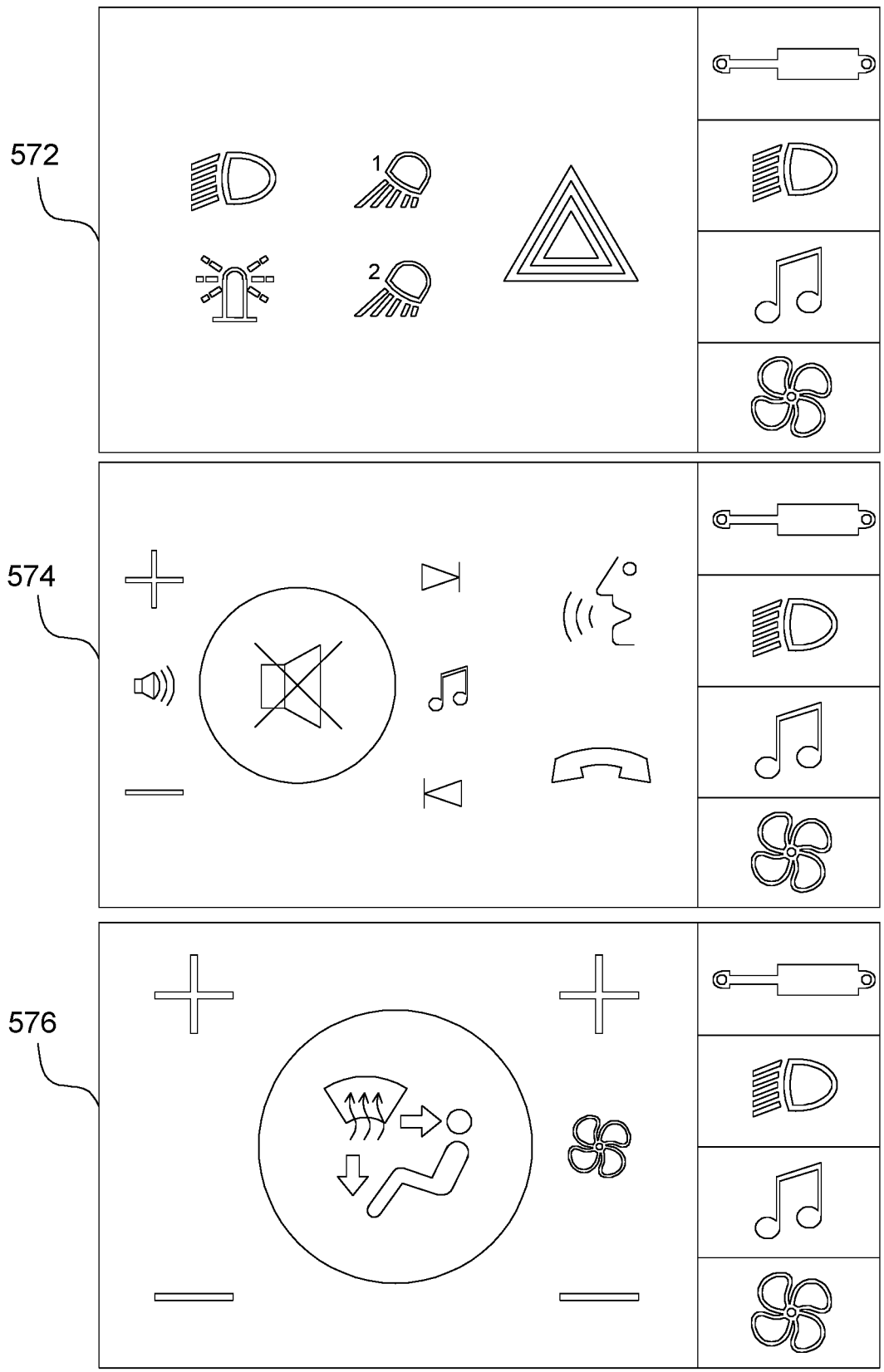
FIG. 6 is an illustration of machine control graphics displayed on a user interface of the control system of FIG. 2 according to an embodiment.

Referring now to FIGS. 4-6, each display 126a, 126b, and 126c can be configured by the operator based on the selection of the graphics 130, 132, 134 which each has an associated control function. For example, in some embodiments, the operator may change the apparatus configuration and display graphics 130, 132, 134 by selecting a different group of graphics (e.g., graphics 340), which may be accessed via a selection button 320 arranged on the display screen such as display screen 316. The selection button 320 can include a drop-down selection feature that allows a user to select from a variety of display graphics 340. As shown in FIG. 4, the display graphics 340 can include, without limitation, planter graphics 336a, 336b, row unit graphics 330a, 330b, marker graphics 332a, 332b, 334a, 334b, or scraper graphics 338a, 338b, with each graphic being associated with a control function. In other embodiments, different display graphics (e.g., tillage unit, sprayer boom, or others) may be selected based on field operations to be performed by the work vehicle 150. The graphics may also include various hydraulic controls or power devices such as powered take off (PTO).

Additionally, as previously discussed, the operator may reconfigure the display screen 116 to change the control outputs associated with each of the control units 113, 115, 117. In some embodiments, the operator may reconfigure the display screen 116 by changing the relative arrangement of the upper and lower display graphics (e.g., 130a, 130b), the relative arrangement of the displays 126a, 126b, and 126c, or by changing display screens. For example, utilizing a drag and drop feature, the operator may change the display graphics displayed in either of the displays 126a, 126b, or 126c or rearrange a position of the displays 126a, 126b, 126c. In some embodiments, the operator may switch positions of the upper and lower display graphics 130a, 130b as indicated by the arrow 140 to reverse control functions associated with control unit 113. Similarly, the operator may reconfigure the displays 126a, 126b, and 126c by switching adjacent positions of the displays on display screen 116 or by accessing one or more displays (e.g., display 226a) from additional display screens such as display screen 216.

Display screen 216 is substantially similar to display screen 116 and can be accessed by scrolling left or right on the user interface 104. Display screen 216 can comprise displays 226a, 226b, 226c, which can be configured to include the same or different displays or display graphics as that of display screen 116. For example, as shown in FIG. 5, display 226a can include display graphics 230a, 230b which display a planter configuration and can be associated with a folding function of the planter.

In some embodiments, the operator may reconfigure the display screen 116 by replacing the screen in its entirety with display screen 216 as indicated by arrow 142, or by switching the arrangement of displays 126a, 126b, 126c with displays 226a, 226b, 226c. For example, to change the control outputs associated with control unit 115, the operator may switch an arrangement of display 226a with that of display 126b. This, in turn, reconfigures the control outputs and functions associated with control unit 115 to allow the control unit 115 to control movement of the implement 152 or other apparatus displayed in display 226a (e.g., planter) and deactivates the control functions associated with display 126b. For example, reconfiguration of the displays 126 or 226 or display graphics 130, 340 graphics provides an input to the controller 106 and commands the controller 106 to modify hydraulic controls (e.g., hydraulic or electro-hydraulic cylinders or actuators) associated with the control units 113, 115, 117.

Referring now back to FIG. 2, in some embodiments, the first display 126a can include a planter row unit configuration, and the second and third displays 126b, 126c can include configurations for a left and right marker coupled to the work vehicle 150. Each of the display graphics 130, 132, and 134 have an associated control function (e.g., direction of movement). For example, the row unit graphic 130a can be associated with upward movement of the row unit as indicated by the arrow 133a and the row unit graphic 130b can be associated with downward movement of the row unit in the direction indicated by the arrow 133b. The marker display graphics 132a, 132b, 134a, 134b can be associated with extension and retraction functionalities of the markers as will be discussed below.

The operator can operate the control units 113, 115, and 117 to move the implement 152 or other apparatus displayed in displays 126a, 126b, and 126c between a first position and a second position based on the operator input. For example, the operator can operate the control unit 113 to command the controller 106 to adjust a position of the row unit 130 in an upward or downward direction to engage or disengage a disc member. Similarly, in response to operator inputs, the control units 115, 117 can be configured to provide control inputs to the controller 106 to extend or retract one or more markers coupled to the work vehicle 150. For example, the operator can operate the control units 115 and 117 to extend the left and right markers displayed in displays 126b and 126c to a predetermined position indicated by arrows 135, 137 to create a marked path along the left or right side of the work vehicle 150.

In other embodiments, the user interface 104 can further comprise a mode selection button 420 (FIG. 5), which can include a toggle switch, that allows the operator to interchangeably switch control operations of the implement 152 between the user interface 104 and the control units 113, 115, 117. Additionally, as previously discussed, in some embodiments, the user interface 104 may optionally comprise the selection of machine controls graphics 136 that are associated with various functions discussed with reference to FIGS. 2A and 2B. Selection of each of the machine control graphics 136, each having an associated machine function, can expand the menu selection to access additional machine settings and control functions such as lighting controls 572, audio controls 574, and temperature controls 576 as shown in FIG. 6.

Without in any way limiting the scope, interpretation, or application of the claims appearing below, a technical effect of one or more of the example embodiments disclosed herein is a system and method for reconfiguring operator controls in a work vehicle.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. Method for reconfiguring operator controls of a work vehicle, the method comprising:
   providing a user interface operatively coupled to a control device;
   displaying displays of an apparatus configuration on a display screen of the user interface, each of the displays including graphics associated with a function of an apparatus and the graphics graphically representing operations of the function of the apparatus; wherein each of the displays categorizes the graphics based on the respective functions with a classifying indicator positioned within the display and aligned with the graphics within the display, and two of the graphics associated with the function of the apparatus are switchable between two positions separated by the classifying indicator in one of the displays;
   associating a control output of a control unit of the control device with the function of the apparatus; and
   dynamically adjusting, by a controller, the control output of the control unit to reconfigure operator controls of the work vehicle in response to a change in the graphics in the displays or a change in the relative arrangement of the displays on the display screen.

2. The method of claim 1, wherein the operations of the function of the apparatus comprises flan directions of movement of the apparatus between at least two positions.

3. The method of claim 1, wherein dynamically adjusting the control output of the control unit comprises modifying the function of the apparatus and corresponding hydraulic controls associated with the control unit.

4. The method of claim 1, wherein two of the graphics associated with the function of the apparatus are switchable between two positions separated by the classifying indicator in one of the displays.

5. The method of claim 1, wherein the apparatus comprises an implement coupled to the work vehicle, wherein the controller is configured to control movement of an actuator coupled to the implement to move the implement between a first position and a second position in response to receipt of an operator input to the control unit.

6. The method of claim 1, wherein the user interface comprises two or more display screens viewable by an operator, and wherein dynamically adjusting the control output of the control unit comprises changing a relative arrangement of the two or more display screens or the relative arrangement of displays arranged in each of the two or more di splay screens.

7. The method of claim 1, wherein the user interface comprises a touchscreen display configured to receive control inputs from an operator to change the graphics or the relative arrangement of the displays.

8. The method of claim 1, further comprising displaying one or more machine control graphics having an associated machine function on the display screen, wherein the controller is configured to adjust the machine function in response to receipt of an operator input to the control unit.

9. The method of claim 1, further comprising toggling control between the user interface and the control units to allow an operator to control the function of the apparatus via the user interface or the control units.

10. A system for reconfiguring operators controls of a work vehicle, the system comprising:
   a control device comprising at least one control unit configured to provide a control output associated with a function of an apparatus;
   a user interface coupled to or arranged proximate the control device, wherein the user interface is configured to display graphics of an apparatus configuration included by one of displays shown on a display screen of the user interface, and wherein the graphics are associated with the function of the apparatus and graphically represents operations of the function of the apparatus; wherein each of the displays categorizes the graphics based on the respective functions with a classifying indicator positioned within the display and aligned with the graphics within the display, and two of the graphics associated with the function of the apparatus are switchable between two positions separated by the classifying indicator in one of the displays; and
   a controller, wherein the controller is configured to dynamically adjust the control output of the control unit to reconfigure operator controls of the work vehicle in response to a change in the relative arrangement of the graphics displayed on the user interface.

11. The system of claim 10, wherein the operations of the function of the apparatus comprises flan directions of movement of the apparatus between at least two positions.

12. The system of claim 10, wherein the apparatus comprises an implement coupled to the work vehicle.

13. The system of claim 12, wherein the controller is configured to control movement of an actuator coupled to the implement to move the implement between a first position and a second position in response to receipt of an operator input to the control unit.

14. The system of claim 10, wherein the change in the graphics comprises changing a relative arrangement of graphics in different locations displayed in the display to reconfigure the operator controls of the work vehicle.

15. The system of claim 10, wherein the user interface further comprises a mode selection button, and wherein the mode selection button is configured to toggle control of the function of the apparatus between the user interface and the control units.

16. The system of claim 10, wherein the user interface comprises a touchscreen display configured to receive control inputs from an operator to change the graphics or the relative arrangement of the displays.

17. The system of claim 10, wherein one or more machine control graphics having an associated machine function are displayed on the user interface, and wherein the controller is configured to adjust the machine function in response to receipt of an operator input to the control unit.

18. The system of claim 10, wherein the user interface comprises two or more display screens viewable by an operator, and wherein dynamically adjusting the control output of the control unit comprises changing a relative arrangement of the two or more display screens or the relative arrangement of displays arranged in each of the two or more display screens.

* * * * *